United States Patent
Glover et al.

[11] Patent Number: 5,238,038
[45] Date of Patent: Aug. 24, 1993

[54] PNEUMATIC TIRE

[75] Inventors: William E. Glover, Akron; Deborah K. Vaughn-Lindner, Canal Fulton; Linda M. Lovell, Suffield; Michael L. Pulte, Jr., Tallmadge, all of Ohio

[73] Assignee: The Goodyear Tire & Rubber Company, Akron, Ohio

[21] Appl. No.: 576,879

[22] Filed: Sep. 4, 1990

[51] Int. Cl.$^5$ .................... B60C 11/11; B60C 3/04
[52] U.S. Cl. .................... 152/209 R; 152/454
[58] Field of Search ............. 152/209 R, 209 D, 454, 152/552, 554; D12/146, 147

[56] References Cited

U.S. PATENT DOCUMENTS

| | | | |
|---|---|---|---|
| D. 284,562 | 7/1986 | Kojima et al. | D12/147 |
| D. 291,792 | 9/1987 | Clemens | D12/147 |
| D. 303,945 | 10/1989 | Tsuda et al. | D12/147 |
| D. 307,881 | 5/1990 | Miller et al. | D12/147 |
| D. 315,127 | 3/1991 | White et al. | D12/147 |
| 4,434,831 | 3/1984 | Uemura | 152/554 |
| 4,495,976 | 1/1985 | Makino et al. | 152/554 |
| 4,632,166 | 12/1986 | Fontaine et al. | 152/209 R |
| 4,702,292 | 10/1987 | Brayer | 152/209 R |
| 4,770,221 | 9/1988 | Matsumoto | 152/554 |
| 4,815,511 | 3/1989 | Brayer et al. | 152/454 |
| 4,815,512 | 3/1989 | Gerresheim et al. | 152/209 R |
| 4,957,151 | 9/1990 | Takehara | 152/454 |

FOREIGN PATENT DOCUMENTS

| | | | |
|---|---|---|---|
| 0246997 | 11/1987 | European Pat. Off. | |
| 0323519 | 7/1989 | European Pat. Off. | |
| 0424155 | 4/1991 | European Pat. Off. | |
| 3612081 | 10/1986 | Fed. Rep. of Germany | |
| 8620979 | 12/1987 | Fed. Rep. of Germany | |
| 0078805 | 4/1988 | Japan | 152/209 D |
| 0134313 | 6/1988 | Japan | 152/209 R |
| 0289705 | 11/1989 | Japan | 152/209 R |
| 0034405 | 2/1990 | Japan | 152/209 R |

Primary Examiner—Michael W. Ball
Assistant Examiner—Nancy T. Krawczyk
Attorney, Agent, or Firm—T. P. Lewandowski

[57] ABSTRACT

A pneumatic tire (10) has a tread portion (17) with a series of curved grooves (29,30) extending from each lateral edge ($TE_1$, $TE_2$) of the tread, and a number of circumferentially extending grooves (18, 19, 20, 21). The tread portion (17) has a specific lateral cross-sectional profile with multiple radii ($R_1$, $R_2$, $R_3$)

2 Claims, 6 Drawing Sheets

PNEUMATIC TIRE

The present invention relates generally to pneumatic tires, and more specifically to pneumatic tires having very uniform treadwear characteristics.

A pneumatic tire provides desirable wear and performance characteristics by means of a complex system of interacting structural components. The shape, location, and materials comprising the various structural components of a tire are all influential upon the qualities which a pneumatic tire will exhibit during its useful lifetime on a vehicle. The tire structure disclosed herein has been found to have excellent handling, treadwear, and wet traction characteristics. The new tire structure has a highly desirable pattern of pressure distribution in the footprint of the tire, which is believed to contribute greatly to the aforementioned attributes of the tire.

The present invention may best be understood by referring to the following detailed description in conjunction with the accompanying drawings in which.

Figure 1:
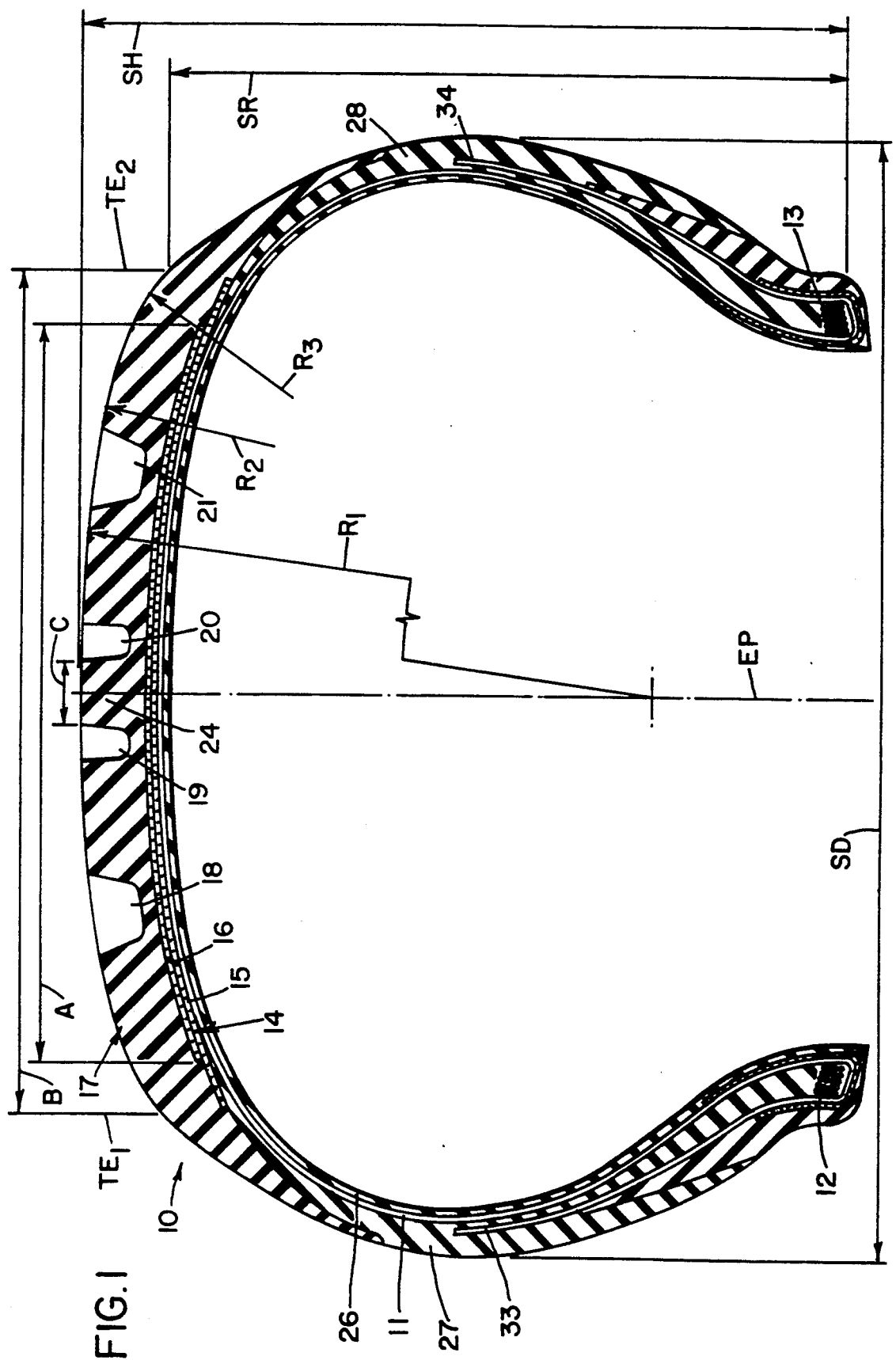
FIG. 1 is a cross-sectional view of a tire according to the embodiment illustrated in FIGS. 2 and 3.

Referring first to FIG. 1 there is shown a cross-sectional view of a tire 10 according to the invention taken in a plane which contains the axis of rotation of the tire. A tire according to the invention is a radial ply pneumatic tire. As used herein and in the claims a radial ply tire is a tire having a carcass ply, or plies, in which the reinforcing cords are oriented at angles in the range of 75° to 90° with respect to an equatorial plane EP of the tire.

As used herein and in the claims the "equatorial plane" EP of a tire is a plane which is oriented perpendicular to the axis of rotation of the tire and is midway between the axial edges $TE_1$, $TE_2$ of the tread in a footprint of the tire. As used herein and in the claims a "footprint of a tire" refers to a static footprint of a tire that has been mounted on its specified rim, inflated to its specified inflation pressure and subjected to its rated load for said inflation pressure. A specified rim, inflation pressure and load for a tire may be determined from the manufacturer of the tire, or from an organization which publishes industry standards applicable at the time at which the tire was manufactured (e.g., The Tire and Rim Association in the U.S.A. or The European Tyre & Rim Technical Organization in Europe). As used herein and in the claims "radial" and "radially" refer to directions which are perpendicular to the axis of rotation of a tire, and "axial" and "axially" refer to directions parallel to the axis of rotation of a tire. As used herein and in the claims the "tread width" B is the greatest axial distance between the lateral edges of a footprint of a tire.

In describing a tire according to the best mode known for practicing the invention at the time of filing of a patent application for this invention in the United States of America a tire of size P195/75 R14 illustrated in FIGS. 1-3 will be described as a working example.

It is believed that the good performance characteristics of a tire according to the invention are attributable at least in part to the cross-sectional shape of the tire. All of the tire cross-sectional dimensions specified herein and in the claims are understood to refer to a tire having a tread portion that has not yet been used on a vehicle, but which has been mounted upon its specified rim, and inflated to its specified inflation pressure while not being subjected to any load. That is to say, it is understood that the invention applies to both new tires and retreaded tires. Definitions of the terms used herein and in the claims for describing the cross-sectional shape of a tire according to the invention are set forth below with reference to FIG. 1.

"Sectional height" SH refers to the radially measured distance from the nominal bead diameter of the tire to the maximum outside diameter of the tire.

"Maximum section width" SD refers to the greatest distance measured in an axial direction between the axially outer surfaces of the tire sidewalls exclusive of indicia or ornamentation on the sidewalls.

"Aspect ratio" refers to the ratio of section height to maximum section width, or put another way SH/SD. For example, a tire according to the working example, of size P195/75 R14, has a specified section height of 146 mm, a specified maximum section width of 195 mm, and thus a specified aspect ratio of 0.75. However, a tire according to the invention may have an aspect ratio in the range of 0.60 to 0.90, preferably in the range of 0.65 to 0.80.

A carcass ply 11 of non-metallic cords is anchored about a pair of axially spaced apart annular beads 12, 13. The carcass ply in the working example comprises polyester cords having a denier of 1000/3 and disposed at a density in the vulcanized tire of 6.69 cords per cm (17 cords per inch). However, it is understood that non-metallic cords of other materials, for example rayon, nylon or aramid may be employed in the practice of the invention depending upon tire size and load carrying requirements. The exact number of carcass plies employed in a tire according to the invention is dependent upon the cord material, cord density, tire size and desired load supporting capacity of the tire. The turn-up portions 33, 34 of the carcass ply are folded axially and radially outwardly around the beads 12, 13 varying distances depending upon the size of the tire and the number of carcass plies. If, as in the working example, the tire has a maximum section width SD of greater than 180 mm and has only a single carcass ply, the radially outer edges of the turn-up portions of the carcass ply should be disposed within 1.27 cm (0.5 inch), preferably 0.76 cm (0.3 inch of the radial location at which the tire is at its maximum section width SD. However, if the tire has more than one carcass ply, and/or has a maxmum section width SD of less than 180 mm, then the radially outer edges of the turn-up portions of the carcass ply should be disposed radially outwardly of the beads 12, 13 by not more than 2.54 cm. In the working example the cords of the carcass ply 11 are specified to be oriented at angles with respect to the equatorial plane EP of the tire of 90°.

Preferably, a tire according to the invention is a tubeless tire having a layer 26 of a low permeability elastomeric material disposed inwardly of the carcass ply 11, or plies, and contiguous to an inflation chamber defined by a tire and rim assembly.

A circumferentially extending belt structure 14 of metallic cables is disposed radially outwardly of the carcass ply 11 in a crown portion of the tire. The belt structure 14 comprises one or more belt plies 15, 16, each of which comprises a number of metallic cables oriented substantially parallel to one another embedded in a suitable elastomeric compound and oriented in the range of 17° to 25° with respect to the equatorial plane EP of the tire. In the working example the cables in the belt plies are specified to be oriented at 23° with respect to the equatorial plane of the tire. The cables in each belt ply are oriented in an opposite sense, with respect to the equatorial plane EP of the tire, from the metallic cables of any next adjacent belt ply. The metallic cables used in the working example have a structure of two metallic filaments of 0.30 mm diameter high tensile steel wire disposed at a density of 9.84 cables per cm (25 cables per) inch in a vulcanized tire. In the working example the belt structure comprises two belt plies, neither of which is folded. However; it is believed that any combination of folded and/or unfolded belt plies reinforced by suitable metallic cables selected in accordance with good engineering practices may be employed in practicing the broader aspects of the invention. The radially outermost belt ply 16 of the belt structure 14 of a tire according to the invention has an axial width A that is in the range of 78% to 105% preferably 83% to 93% of the tread width B. The radially outermost belt ply of the belt structure of a tire according to the working example has an axial width of about 88% of the tread width. In the working example the radially inner belt ply 15 has an axial width of 154 mm and the radially outer belt ply 16 has an axial width of 140 mm.

A circumferentially extending tread portion 17 is disposed radially outwardly of the belt structure 14. Elastomeric sidewalls 27, 28 are disposed axially outwardly of the carcass structure and extend radially inwardly from the tread portion 17 to the bead portions of the tire. The tread has at least two grooves 18, 19, 20, 21 therein which extend circumferentially about the tread. The number of circumferentially extending grooves is a function of the size of a tire. For example a tire having a maximum section width SD of greater than 180 mm may have a tread structure with four circumferential grooves 18, 19, 20, 21, as in the embodiment illustrated in FIGS. 2 and 3 with two circumferentially extending grooves on each side of the equatorial plane of the tire, while a tire 41 having a maximum section width SD of less than 180 mm may have a tread structure 42 with only two circumferential grooves 22, 23 as in the embodiment illustrated in FIGS. 4 and 5 with only one circumferentially extending groove on each side of the equatorial plane of the tire. Nevertheless, regardless of the tire size one of the circumferentially extending grooves 19, 20; 22, 23 is disposed on each side of the equatorial plane EP of the tire. In a preferred embodiment, and the working example, a circumferentially extending central row of blocks 24, 25 which is intersected by the equatorial plane EP of the tire is interposed between the circumferential grooves 19, 20; 22, 23 which are nearest to the equatorial plane on each side thereof. In a tire according to the invention the axial extent C of the central row of blocks 24, 25 is in the range of 9% to 20% of the tread width B. The axial extent of the central row of blocks in the working example is about 16% of the tread width.

On each side of the equatorial plane of the tire a circumferentially spaced set of curved grooves 29, 30; 31, 32, that is to say grooves which follow curved paths, extend from a lateral edge $TE_1$, $TE_2$ of the tread to the circumferentially extending groove 19, 20; 22, 23 which is nearest to the equatorial plane EP of the tire on the same side of the equatorial plane as the tread edge from which the curved grooves extend. All of the grooves in each set of curved grooves are curved in the same direction, but in an opposite direction from the curved grooves of the other set which is disposed on the opposite side of the equatorial plane of the tire.

Figure 2:
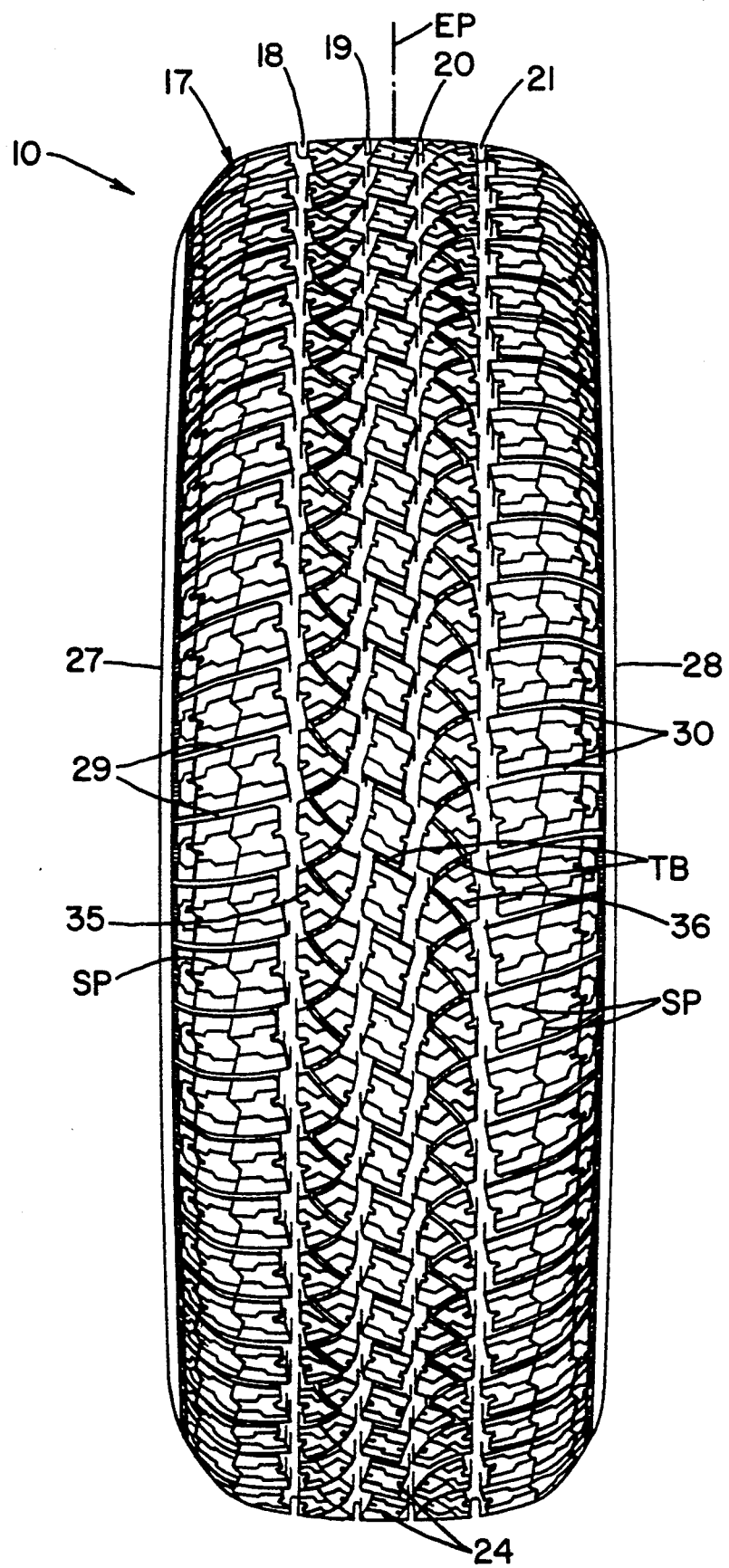
FIG. 2 is a front elevational view of a tire according to a first embodiment of the invention.

See, for example, grooves 29 of FIG. 2 which are concave while grooves 30 are convex.

Figure 3:
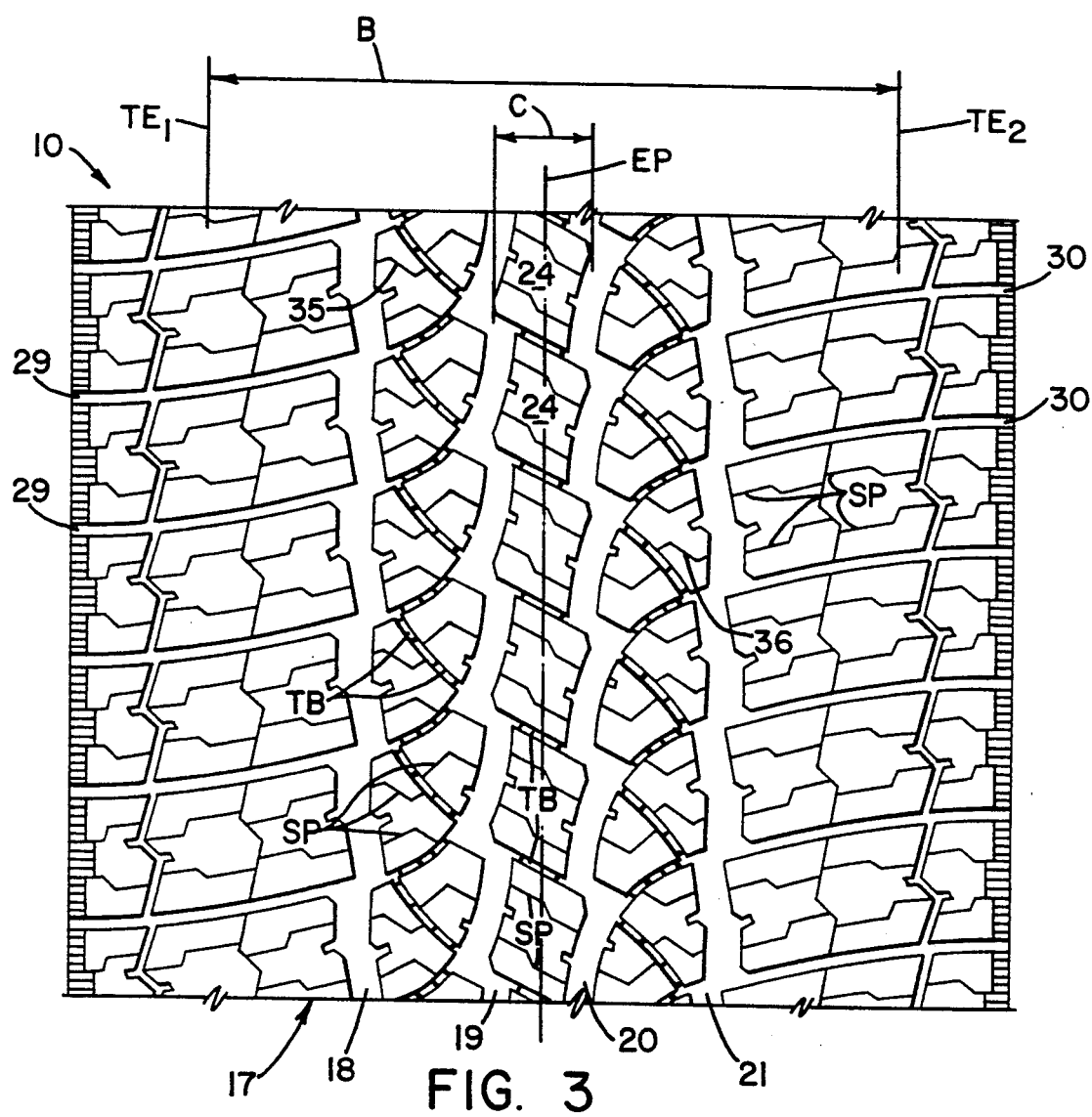
FIG. 3 is a fragmentary front elevational view of the embodiment shown in FIG. 2 on an enlarged scale.
Figure 4:
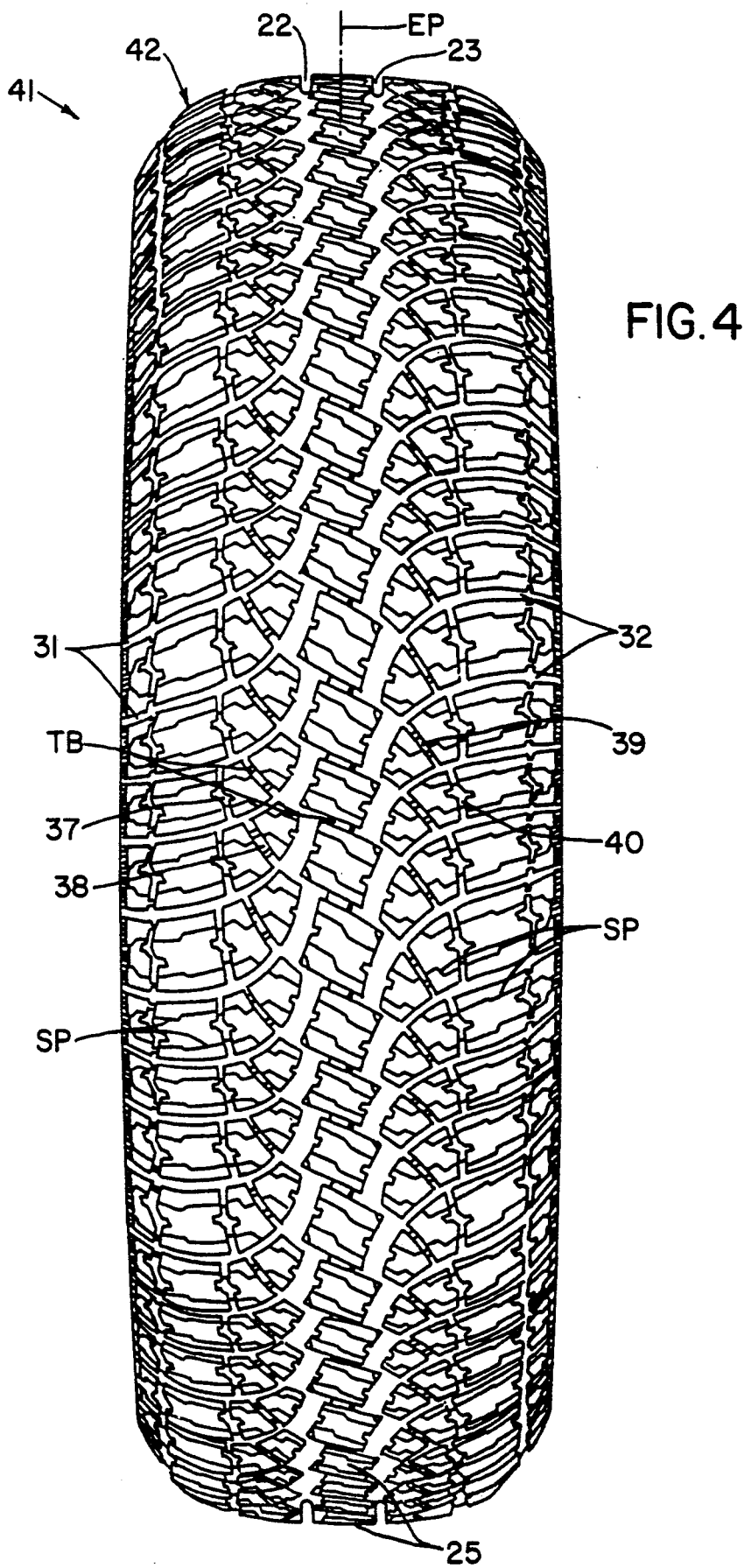
FIG. 4 is a front elevational view of a tire according to a second embodiment of the invention.
Figure 5:
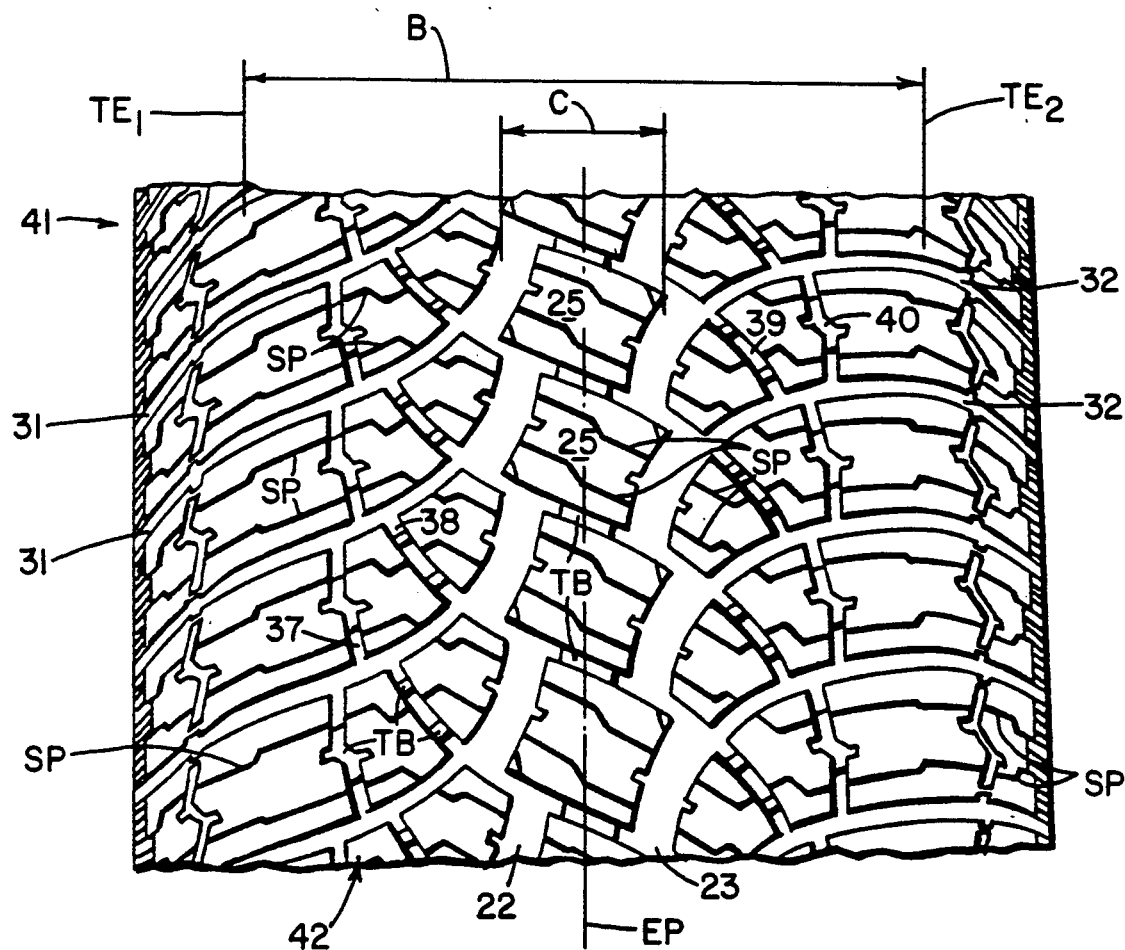
FIG. 5 is a fragmentary front elevational view of the embodiment shown in FIG. 4 on a enlarged scale.

In the working example, and in all preferred embodiments, a number of secondary grooves, as shown at 35 and 36 in FIG. 3 and at 37, 38, 39 and 40 in FIG. 5, extend between circumferentially next adjacent curved grooves 39;30;31;32. In the working example, and in all preferred embodiments, the secondary grooves contain what are known in the art as "tire bars", which are all identified as TB in FIGS. 3 and 5. While the maximum depth of the secondary grooves is substantially equal to the depths of the circumferentially extending grooves and the curved grooves, the tie-bars are portions of the secondary grooves that are only about 60% of the depth of the remainder of the secondary groove, and aid in fine-tuning the flexibility of the tread blocks which border the secondary grooves. Likewise the grooves separating the blocks in the central row of blocks contain similar tire-bars. Each of the blocks in the tread portion is preferably traversed by very narrow zig-zag grooves which are commonly referred to as "sipes", which are all identified as SP in FIGS. 3 and 5. The depth of the sipes is preferably, and in the working example, about 90% of the depth of the circumferentially extending grooves and the curved grooves.

In a most preferred embodiment the tread portion has very specific structural features laterally across the tread. In the embodiment illustrated in FIG. 3, when the portion of the tread disposed between the equatorial plane EP and either tread edge $TE_1$, $TE_2$ is divided in five zones of equal axial width, the net-to-gross ratio in each zone beginning with the zone adjacent the equatorial plane and ending with the zone adjacent to a tread edge are in the following ranges: 0.47 to 0.57; 0.71 to 0.81; 0.35 to 0.45; 0.78 to 0.88; and 0.76 to 0.86. As used herein and in the claims, net-to-gross ratio is understood to mean the ratio between the surface area of the tread which comes into contact with the ground in a static footprint of a tire versus the total area of the static footprint of the tire. In each of said zones, beginning with the zone adjacent to the equatorial plane and ending with the zone adjacent to a tread edge the ratio of linear length of the sipes SP to each square inch of footprint area is in the following ranges:

0.43 to 0.51 cm of sipes/$cm^2$ (1.1 to 1.3 inches of sipes/$in^2$;) 69 to 0.75 cm of sipes/$cm^2$ (1.75 to 1.9 inches of sipes/$in^2$); 0.39 to 0.47 cm of sipes/$cm^2$ (1.0 to 1.2 inches of sipes/$in^2$) 0.71 to 0.79 (1.8 to cm of sipes/$cm^2$ (2.0 inches of sipes/$in^2$) and 1.34 to 1.46 cm of sipes/$cm^2$ (3.4 to 3.7 inches of sipes/$in^2$).

In the working example the tread elements which are defined by the various grooves in the tread portion of the tire have varying dimensions in the circumferential direction in order to reduce the noise generated by the tire as it rotates against a road surface, and in the working model the pitching sequence is like that taught in U.S. Pat. No. 4,823,853. However; in some embodiments it has been found to be preferable to use a pitching sequence like that taught in U.S. Pat. Nos. 4,327,792 and 4,474,223.

It is widely recognized in the tire art that the elastomeric compound or compounds of which the tread portion 17 is comprised have a very significant effect upon the performance characteristics of a tire such as traction and rate of treadwear. In the preferred embodiments at least a radially outermost layer of the tread portion comprises an elastomeric compound having a Shore A hardness of 50 to 60, an elongation at break of 650% to 750%, and a 300% modulus in the range of 5 mn/m$^2$ to 6 mn/m$^2$ as determined by ASTM standard D412. The tread compound of a tire according to the working example has a specified Shore A hardness of 55, a specified elongation at break of 700% and a 300% modulus of 5.5 mn/m$^2$.

Of course, it is recognized in the art of tire tread rubber compounding that when a particular performance characteristic is required, for example rolling resistance, the specialized compound may be outside of the ranges that have been specified.

The tread portion of a tire according to the invention has an overall lateral profile taken in a plane that contains the axis of rotation of the tire, when the tire is mounted upon its specified rim and inflated to its specified inflation pressure such that:

(1) the outside radius SR of the tire at each axial edge of the tread portion is in the range of 8% to 9.5% less than the section height SH of the tire;

(2) the tread portion has a first radius $R_1$ over a primary arc in the range of 59% to 63% of the tread width B on each side of the equatorial plane, the center of the first radius being located on the equatorial plane of the tire; and, (3) secondary arcs having a second radius $R_2$ extending from each end of said first arc to the nearest lateral edge of the tread portion; the second radius $R_2$ is in the range of 35% to 40% of the first radius $R_1$, and each secondary arc ending at least 90% of the distance from the equatorial plane to the axial edge $TE_1$, $TE_2$ of the tread.

In the working example and the most preferred embodiment tertiary arcs have a third radius $R_3$ extending from the axially outer edge of each secondary arc, past the axial edges of the tread portion to the tire sidewalls 27, 28, the third radius being less than the second radius.

In the working example the first radius $R_1$ is 35.6 cm (14 inches), the second radius $R_2$ is 13.56 cm (5.34 inches) and the third radius $R_3$ is 3.18 cm (1.25 inches.

Most preferably, the primary arc extends in an axial direction from the equatorial plane EP a distance equal to 0.618 times the axial distance from the equatorial plane to the axially outermost end of the secondary arc, and the radius $R_2$ of the second arc is $(0.618)^2$ times the first radius $R_1$.

Figure 6:
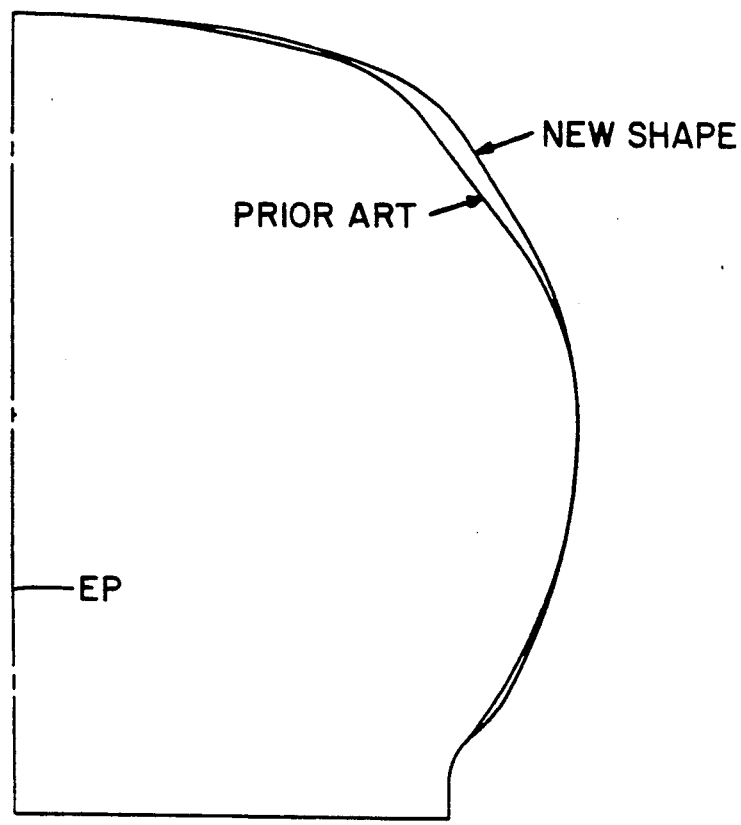
FIG. 6 is a diagrammatic representation showing both the prior art cross-sectional tire shape and the cross-sectional tire shape of the new tire.
Figure 7:
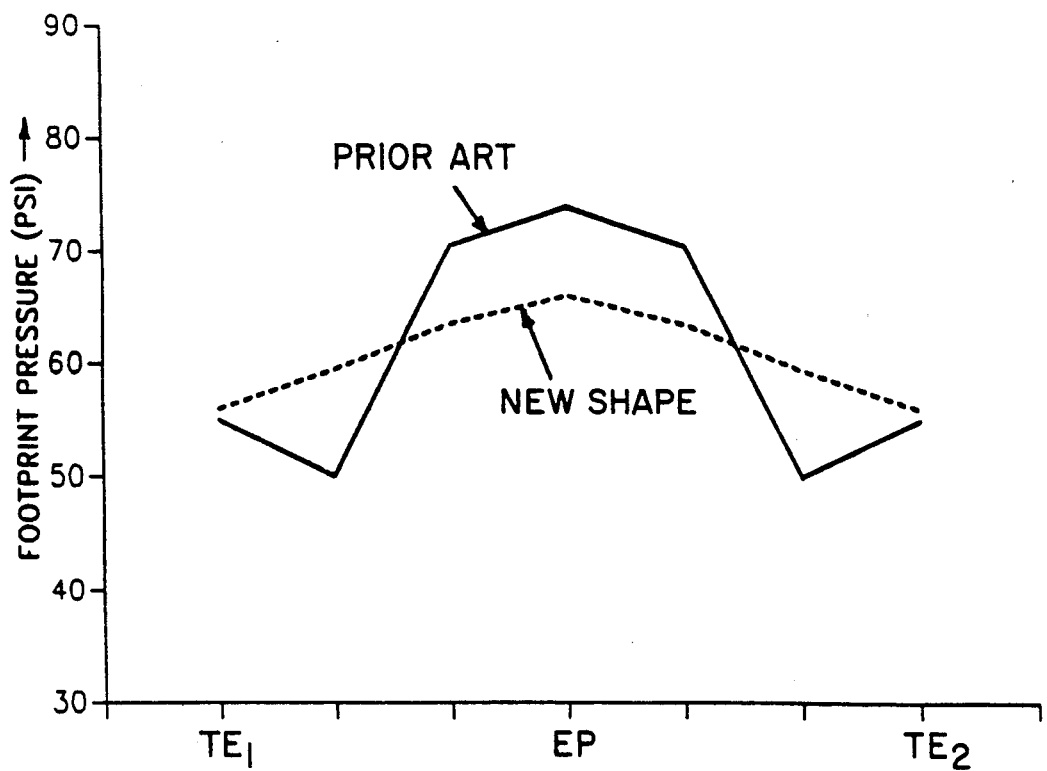
FIG. 7 is a graph showing pressure distributions in tire footprints.

The advantage of a tire having the cross-sectional shape disclosed herein in combination with the tire structure disclosed herein may best be described with reference to FIGS. 6 and 7. FIG. 6 is a schematic view of the profile on one side of the equatorial plane (EP). The PRIOR ART tire profile has been used for example in a tire sold commercially by THE GOODYEAR TIRE & RUBBER COMPANY under the product name VECTOR ®. The profile labeled as "NEW SHAPE" is the profile disclosed herein. Tires were manufactured having the tread pattern, and tire construction disclosed herein, but some tires had the PRIOR ART shape and some tires had the NEW SHAPE. FIG. 7 shows the distribution of footprint pressure across a tire with each of the cross-sectional shapes, and it is quite evident that the footprint pressure distribution is more consistent in a tire having the NEW SHAPE. The advantages of having a more evenly distributed footprint pressure laterally across the tread are that the tread should wear more evenly laterally across the tread and that other performance characteristics should be improved such as reduced hydroplaning.

It will be apparent to those skilled in the tire art that other features of the tire could be modified while remaining within the scope of the present invention.

We claim:

1. A radial ply pneumatic tire comprising:
   (a) a carcass ply of non-metallic cords which is anchored about a pair of axially spaced apart annular beads, said beads defining a nominal bead diameter,
   (b) a circumferentially extending belt structure comprising no more than two belt plies one or more of which is of metallic cables disposed radially outwardly of the carcass ply; and
   (c) a circumferentially extending tread portion disposed radially outwardly of the belt structure; said tread portion comprising a circumferentially extending row of blocks which is intersected by the equatorial plane of the tire and is interposed between two grooves in the tread portion which extend circumferentially thereabout, the axial extent of the row of blocks being in the range of 9% to 20% of the tread width, circumferentially spaced sets of grooves which follow curved paths extend from a lateral edge of the tread across third and fourth circumferentially extending grooves, one each on opposite sides of the equatorial plane to end in the circumferentially extending grooves on each side of the equatorial plane, all of the grooves in each set of curved grooves being curved in the same direction, but in an opposite direction from all the curved grooves of the other set; and said tread portion having an overall outside lateral profile taken in a plane that contains the axis of rotation of the tire when the tire is mounted upon a specified rim and inflated to a specified inflation pressure such that:

(1) the outside radius (SR) of the tire at each lateral edge of the tread portion is in the range of 8% to 9.5% less than the section height (SH) of the tire, said outside radius and said section height are measured from the nominal bead diameter, (2) the tread portion has a first radius over a first arc in the range of 59% to 63% of the tread width on each side of the equatorial plane, the center of said first arc being located on the equatorial plane of the tire, (3) secondary arcs having a second radius extending from each end of the said first arc to the nearest lateral edge of the tread portion, said second radius being in the range of 35% to 40% of said first radius and each secondary arc ending at least 90% of the distance from the equatorial plane to the axial edge of the tread portion, (4) said secondary arcs not extending to the axial edges of the tread portion and tertiary arcs having a third radius extend from the axially outer edge of each secondary arc past an axial edge of the tread portion to a tire sidewall.

2. A radial ply pneumatic tire comprising:
(a) a carcass ply of non-metallic cords which is anchored about a pair of axially spaced apart annular beads, said beads defining a nominal bead diameter,
(b) a circumferentially extending belt structure comprising no more than two belt plies one or more of which is of metallic cables disposed radially outwardly of the carcass ply; and
(c) a circumferentially extending tread portion disposed radially outwardly of the belt structure; said tread portion comprising a circumferentially extending row of block which is intersected by the equatorial plane of the tire and is interposed between two grooves in the tread portion which extend circumferentially thereabout, the axial extent of the row of blocks being in the range of 9% to 20% of the tread width. circumferentially spaced sets of grooves which follow curved paths extend from a lateral edge of the tread across third and fourth circumferentially extending grooves one each on opposite sides of the equatorial plane to end in the circumferentially extending grooves on each side of the equatorial plane, all of the grooves in each set of curved grooves being curved in the same direction, but in an opposite direction from all of the curved grooves of the other set; and said tread portion having an overall outside lateral profile taken in a plane that contains the axis of rotation of the tire when the tire is mounted upon a specified rim and inflated to a specified inflation pressure such that;

(1) the outside radius (SR) of the tire at each lateral edge of the tread portion is in the range of 8% to 9.5% less than the section height (SH) of the tire said outside radius and said section height are measured from the nominal bead diameter, (2) where five equal axial width zones between the equatorial plane and either tread edge have a net-to-gross tread ratio in each zone beginning with the zone adjacent the equatorial plane and ending with the zone adjacent to a tread edge in the following ranges: 0.47 to 0.57, 0.71 to 0.81, 0.35 to 0.45, 0.78 to 0.88 and 0.76 to 0.86.

* * * * *